US011069209B1

(12) United States Patent
Will et al.

(10) Patent No.: US 11,069,209 B1
(45) Date of Patent: Jul. 20, 2021

(54) TEAM MONITORING

(71) Applicant: ROCKIWILLI RMR LLC, Renton, WA (US)

(72) Inventors: Travis E. Will, Renton, WA (US); Russell E. VanDevanter, Seattle, WA (US); Steven M. Myhre, Seattle, WA (US); Michael J. Myhre, Monroe, WA (US)

(73) Assignee: ROCKWILLI RMR LLC, Renton, WA (US)

( * ) Notice: Subject to any disclaimer, the term of this patent is extended or adjusted under 35 U.S.C. 154(b) by 0 days.

(21) Appl. No.: 17/173,533

(22) Filed: Feb. 11, 2021

Related U.S. Application Data

(60) Provisional application No. 62/984,391, filed on Mar. 3, 2020, provisional application No. 62/975,567, filed on Feb. 12, 2020.

(51) Int. Cl.
| | | |
|---|---|---|
| *G07C 1/32* | (2006.01) | |
| *G08B 13/196* | (2006.01) | |
| *H04M 1/72415* | (2021.01) | |
| *H04M 1/72469* | (2021.01) | |

(52) U.S. Cl.
CPC . *G08B 13/19684* (2013.01); *G08B 13/19613* (2013.01); *G08B 13/19682* (2013.01); *H04M 1/72415* (2021.01); *H04M 1/72469* (2021.01)

(58) Field of Classification Search
CPC ............. H04N 21/812; G06T 19/006; G06Q 30/0252; G06Q 20/227; G06K 9/6268; H04L 65/1069; H04L 51/04; H04L 65/1076; G06F 11/3438; G06F 11/3423; G06F 9/541; G06F 3/04812; G06F 11/321; H04W 4/029
See application file for complete search history.

(56) References Cited

U.S. PATENT DOCUMENTS

2019/0347180 A1*  11/2019  Cranfill .................. H04L 67/12

* cited by examiner

*Primary Examiner* — Phuoc H Doan
(74) *Attorney, Agent, or Firm* — Puget Patent; Michael Gibbons

(57) ABSTRACT

A solution for providing premises monitoring whereby monitoring devices (cameras, e.g.) are connected to a network and, upon detecting motion within their field of view, send a notification to a smartphone app. The smartphone app provides indications of a location of a particular monitoring device triggering the event notification, a time/date of the event, and a type of event. A user of the smartphone app may receive a real-time video stream from the monitoring device, and may interact with a person who triggered the event using the smartphone's speaker and microphone in conjunction with a speaker and/or a microphone integrated with the monitoring device. A button of the smartphone app enables an event to be escalated to a monitoring center, and if an event is not reviewed by a user within a certain time threshold the event may be configured to be automatically escalated to the monitoring center.

1 Claim, 5 Drawing Sheets

TEAM MONITORING

PRIORITY CLAIM

The present application is related to and/or claims the benefits of the earliest effective priority date and/or the earliest effective filing date of the below-referenced applications, each of which is hereby incorporated by reference in its entirety, to the extent such subject matter is not inconsistent herewith, as if fully set forth herein:

(1) this application constitutes a non-provisional of U.S. Provisional patent Application No. 62/975,567, entitled SYSTEMS AND METHODS FOR AUTOMATED PERSONAL EMERGENCY RESPONSES, naming Travis E. Will, Russell E. VanDevanter, Steven M. Myhre, and Michael J. Myhre as the inventors, filed Feb. 12, 2020, which is currently co-pending or is an application of which a currently co-pending application is entitled to the benefit of the filing date; and (2) this application constitutes a non-provisional of United States Provisional patent Application No. 62/984,391, entitled TEAM MONITORING, naming Travis E. Will, Russell E. VanDevanter, Steven M. Myhre, and Michael J. Myhre as the inventors, filed Mar. 3, 2020, which is currently co-pending or is an application of which a currently co-pending application is entitled to the benefit of the filing date.

INCORPORATION BY REFERENCE

The subject matter of U.S. patent application Ser. No. 15/407,544, entitled Systems and Methods for Automated Personal Emergency Responses, filed Jan. 17, 2017, is hereby incorporated by reference in the entirety, to the extent that the contents of the foregoing application are not inconsistent with the disclosure herein.

BACKGROUND OF THE INVENTION

The present disclosure relates generally to surveillance systems, and more specifically, to team monitoring surveillance systems.

BRIEF SUMMARY OF THE INVENTION

A summary of certain embodiments disclosed herein is set forth below. It should be understood that these aspects are presented merely to provide the reader with a brief summary of these certain embodiments and that these aspects are not intended to limit the scope of this disclosure.

Embodiments of the present disclosure relate generally to surveillance systems, and more specifically, to team monitoring surveillance systems. A solution for providing premises monitoring is disclosed whereby monitoring devices (cameras, e.g.) are connected to a network and, upon detecting motion within their field of view, send a notification to a smartphone app. The smartphone app provides indications of a location of a particular monitoring device triggering the event notification, a time/date of the event, and a type of event. A user of the smartphone app may receive a real-time video stream from the monitoring device, and may interact with a person who triggered the event using the smartphone's speaker and microphone in conjunction with a speaker and/or a microphone integrated with the monitoring device. A button of the smartphone app enables an event to be escalated to a monitoring center, and if an event is not reviewed by a user within a certain time threshold the event may be configured to be automatically escalated to the monitoring center.

BRIEF DESCRIPTION OF THE DRAWINGS

Certain embodiments of the present invention are described in detail below with reference to the following drawings.

DETAILED DESCRIPTION OF THE INVENTION

Specific details of certain embodiments of the invention are set forth in the following description and in the figures to provide a thorough understanding of such embodiments. The present invention may have additional embodiments, may be practiced without one or more of the details described for any particular described embodiment, or may have any detail described for one particular embodiment practiced with any other detail described for another embodiment.

Importantly, a grouping of inventive aspects in any particular "embodiment" within this detailed description, and/or a grouping of limitations in the claims presented herein, is not intended to be a limiting disclosure of those particular aspects and/or limitations to that particular embodiment and/or claim. The inventive entity presenting this disclosure fully intends that any disclosed aspect of any embodiment in the detailed description and/or any claim limitation ever presented relative to the instant disclosure and/or any continuing application claiming priority from the instant application (e.g. continuation, continuation-in-part, and/or divisional applications) may be practiced with any other disclosed aspect of any embodiment in the detailed description and/or any claim limitation. Claimed combinations which draw from different embodiments and/or originally-presented claims are fully within the possession of the inventive entity at the time the instant disclosure is being filed. Any future claim comprising any combination of limitations, each such limitation being herein disclosed and therefore having support in the original claims or in the specification as originally filed (or that of any continuing application claiming priority from the instant application), is possessed by the inventive entity at present irrespective of whether such combination is described in the instant specification because all such combinations are viewed by the inventive entity as currently operable without undue experimentation given the disclosure herein and therefore that any such future claim would not represent new matter.

Figure 1:
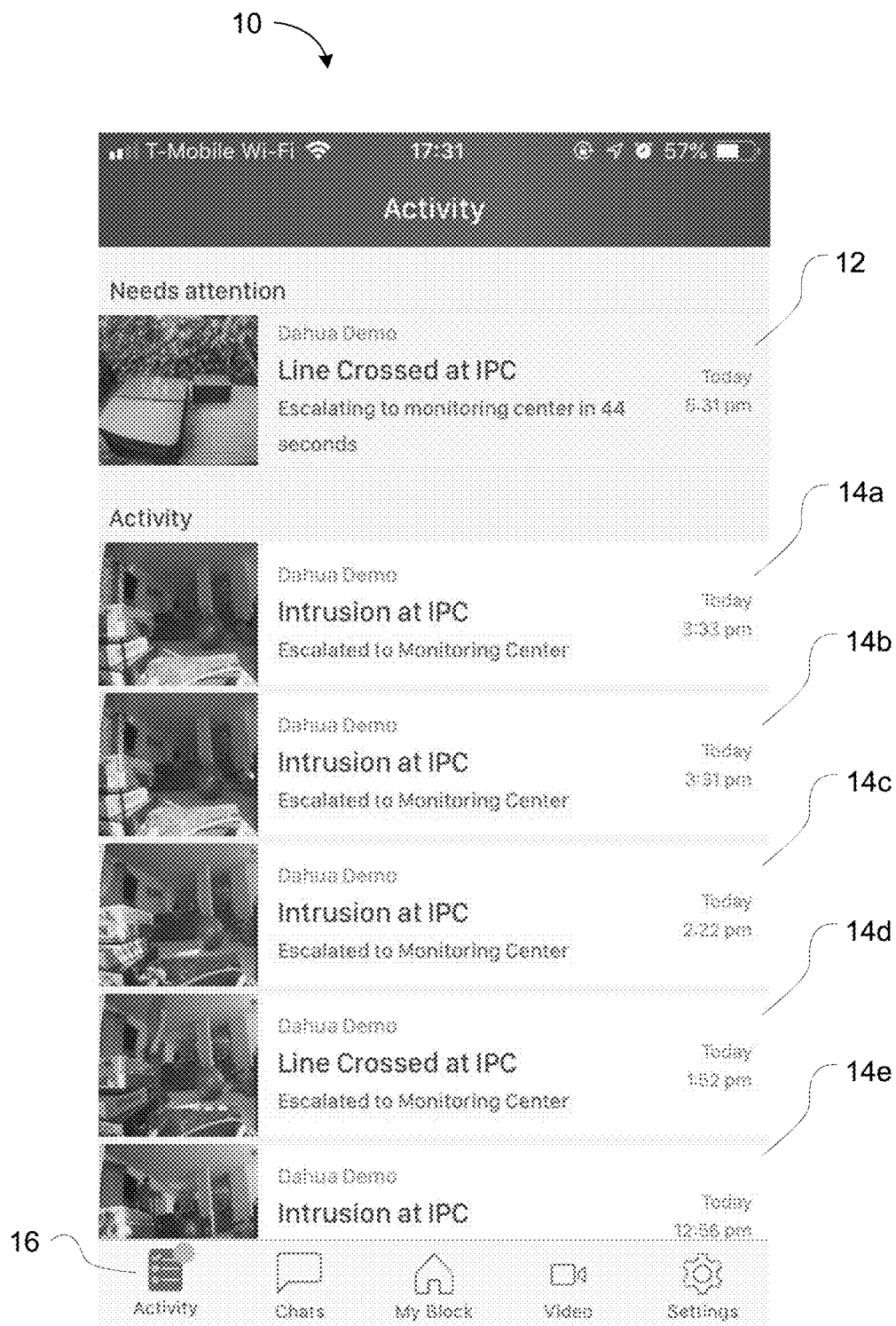
FIG. 1 depicts an exemplary user interface of a smartphone app related to team monitoring surveillance systems, in accordance with an embodiment of the invention.

FIG. 1 depicts an exemplary user interface of a smartphone app related to team monitoring surveillance systems, in accordance with an embodiment of the invention. In some embodiments, a video event is triggered on a premises, which may be a residential or a commercial premises. A notification of the video event is transmitted to a group of responders that have been preconfigured to receive notifications relating to a particular zone and/or a particular monitoring device associated with the premises. The notification of the video event may be received by the cell phone app, which renders the notification on display 10. Display 10 includes two sections, one named "Needs 100 attention" and one named "Activity". "Needs attention" may include event notifications which have been received and to which has not been viewed or otherwise interacted with by the recipient, including video event notification 12. "Activity" may include event notifications which have been viewed or otherwise interacted with by the recipient, including video event notifications 14*a* through 14*e*. At the bottom of display 10 is a bar 16 which may enable the user to switch displays and which indicates that the "activity" 105 display is currently selected.

Video event notification 12 includes an indication of the premises (here, "Dahua Demo") where the video event was triggered. A description of the type of video event (here, "Line Crossed at IPC") is provided. A date and time associated with the video event notification (here, "Today" and "5:31 pm") is also provided.

In some embodiments, notifications can be configured to be addressed first by any one responder from the group of the responders preconfigured to receive notifications relating to a particular zone and/or a particular monitoring device associated with the premises. If no one individual responder either responds via the app within a preconfigured threshold of time, the video event notification is automatically escalated to a monitoring center. In some embodiments, the monitoring center is a commercial alarm monitoring company such as ADT. In other embodiments, the monitoring center is 911 or other public safety agency. In yet other embodiments, the escalation is configured for notification of both a commercial alarm monitoring company and 911 or another public safety agency. Video event notification 12 displays a countdown (here, "Escalating to monitoring center in 44 seconds") of an amount of time left before the preconfigured threshold of time, after which time the notification will be escalated.

Figure 2:
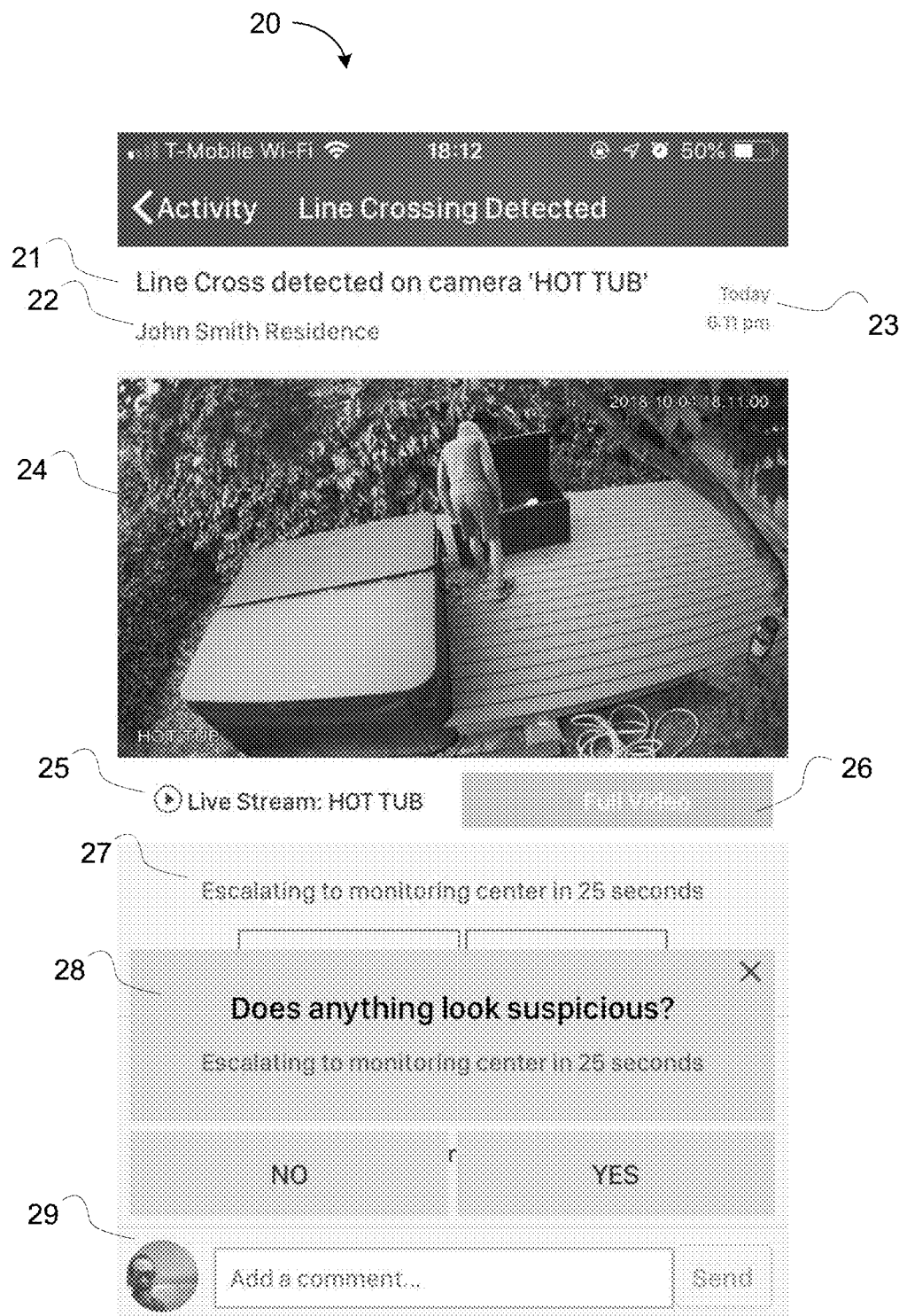
FIG. 2 depicts an additional exemplary user interface of a smartphone app related to team monitoring surveillance systems, in accordance with an embodiment of the invention.

FIG. 2 depicts an additional display of the exemplary user interface of the smartphone app related to team monitoring surveillance systems, in accordance with an embodiment of the invention. In some embodiments, the app can display details related to a particular video event. Display 20, for example, relates to a "Line Crossing Detected" event. More information is shown about the event at 21, which includes "Line Cross" (the type of event that was detected) and "on camera 'HOT TUB'" (the zone, 125 and the device used to detect the event in that zone). The name of the premises 22 is shown (here, "John Smith Residence"). The date and time of the event 23 is also shown (here, "Today 6:11 pm"). A box 24 displays one or more images related to the event. Below box 24, the user may toggle between a live stream at 25 and a full video at 26. In the live stream, video captured by the camera is relayed to the app in real-time and displayed to the responder so that the responder may determine whether the event is still occurring (e.g. an intruder or target is still on the premises). The full video may include a video clip of the occurrence which triggered the video event (e.g. the camera detected a motion by a being large enough for an inference that an intruder or target is on the premises). Embedded in the full video may be a button which, when tapped, switches the app to the live stream view (activating the RTSP for that camera, for example). In some embodiments, watching a live stream also activates a speaker and microphone in the camera in the zone in which the video event was triggered. A responder may use the speaker and microphone in the smartphone on which the app is running to attempt to speak to the target who triggered the video event.

Where the premises include multiple cameras, and in the event that the target has left the zone in which the video event was triggered, the responder may swipe, using the app, to switch the view provided by the app from camera to camera. Each time the responder swipes to a new camera, the speaker and microphone of that new camera is joined to the smartphone so that if the responder is able to visually confirm a presence of the target in a different zone on the premises, the responder may speak to the target via the speaker in the corresponding camera and hear a response picked up by the microphone of the corresponding camera.

At 27, a notification of an amount of time remaining before the video event is escalated to a monitoring center is displayed, as discussed previously. At 28, a pop-up box asks the responder to provide an indication of whether the responder believes, based on the live stream or full video, that a suspicious occurrence has taken place or is occurring at the present time. Pressing "NO" will end the sequence, at which time the app may return to display 10. Pressing "YES" will cause the app to transmit a further notification to at least one of a monitoring center or public safety agency.

At 29, the responder may use the text box in which "Add a comment . . . " is present to post a message. Upon keying text into the text box and pressing "Send", the message is posted to everyone in the responder group. In some embodiments, a video or audio conference is established among the responders facilitated by the smartphone app, whereby the live video stream may be viewable on a portion of the display and a video conference with another responder may be viewable on a different portion of the display. Using such means, and the responders can participate in a "Team Discussion" relating to the video event notification either by chat room or by audio and/or video conference.

Figure 3:
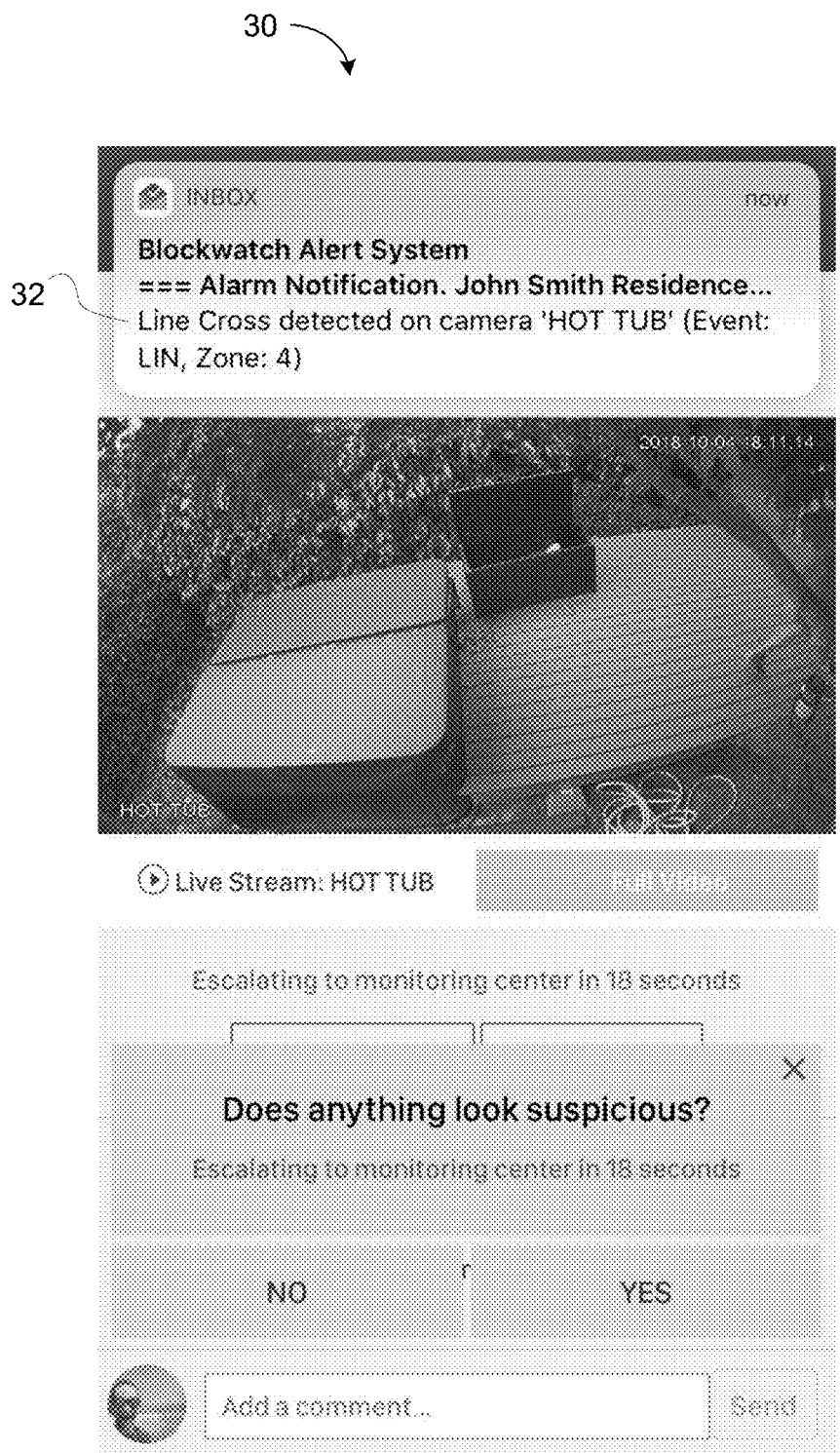
FIG. 3 depicts an additional exemplary user interface of a smartphone app related to team monitoring surveillance systems, in accordance with an embodiment of the invention.

FIG. 3 depicts a notification of an email received by the smartphone on which the app is running, in accordance with an embodiment of the invention. In some embodiments, when a video event occurs, an email may be transmitted to all responders configured to receive video event notifications for the particular zone in which the video event occurred. For example, over top of app display 30, email notification 32 pops up which notifies the responder of the premises, the type of event, the device detecting the target, and the zone in which the video event was triggered by the target. Viewing the email and tapping a link within the email will cause the app to be activated on the phone, if it is not already the currently viewed app.

Figure 4:
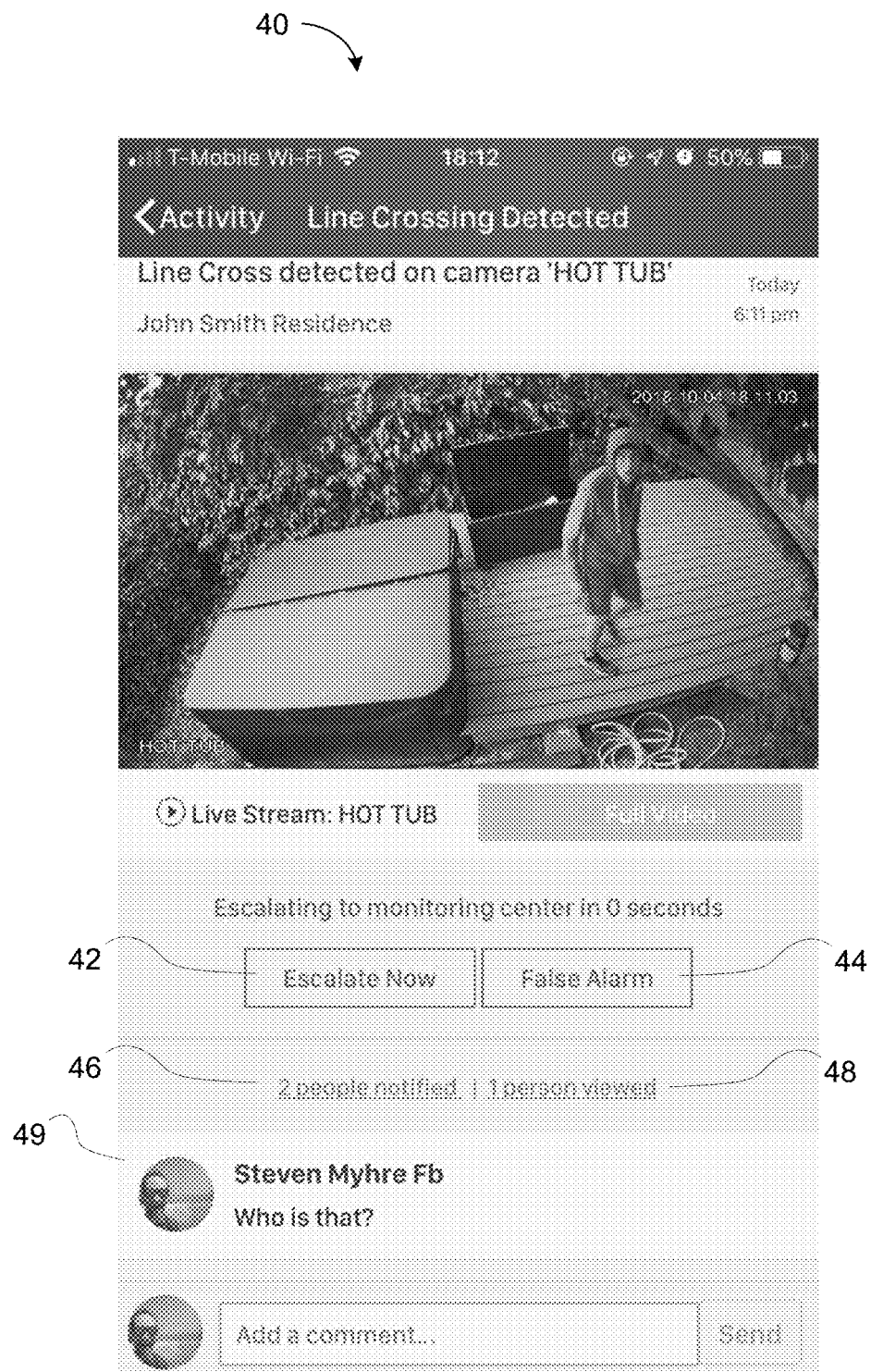
FIG. 4 depicts an additional exemplary user interface of a smartphone app related to team monitoring surveillance systems, in accordance with an embodiment of the invention.

FIG. 4 depicts an additional display of the exemplary user interface of the smartphone app related to team monitoring surveillance systems, in accordance with an embodiment of the invention. In some embodiments, display 40 may include an indication that the video event can be escalated to the monitoring center by a responder tapping the button 42 labeled "Escalate Now". The video event may also be marked as resolved by a responder tapping the button 44 labeled "False Alarm". If neither button is tapped by any responder, as discussed previously, upon the time since the video event was generated reaching the pre-configured threshold for automatic escalation of video events of that type in that zone, the video event will be automatically escalated.

In some embodiments, the number of responders notified is shown at 46 (here, "2 people notified). The number of people who have viewed the video event notification in the app is shown at 48 (here, "1 person viewed"). The "Team Discussion" is shown at 49 (here, "Steven Myhre Fb" has written "Who is that?"). The Team Discussion establishes a virtual control room where the responders may coordinate a response to the video event themselves either prior to, or in lieu of, the event being escalated to the monitoring center.

Data regarding the particular video event is stored for later review by responders, the monitoring center, public safety agency personnel and others. For example, the video clip of the event triggering the video event is stored. If the live stream capability is used, a recording of the live stream is also stored, including any audio transmitted back and forth between the smartphone and the camera device capturing the live stream (storing the contents of any communications between a responder and the target). The stored data may be viewed by other responders using the app, for example, using the chat window. In some embodiments, the video clip may be viewed in a portion of the display while the live stream is viewed in a different portion of the display. The live audio and video data stream which is stored may include any video or audio transmitted by any camera device selected via the user swiping back and forth on the app to choose a view from that different camera until the target is located on the premises.

Figure 5:
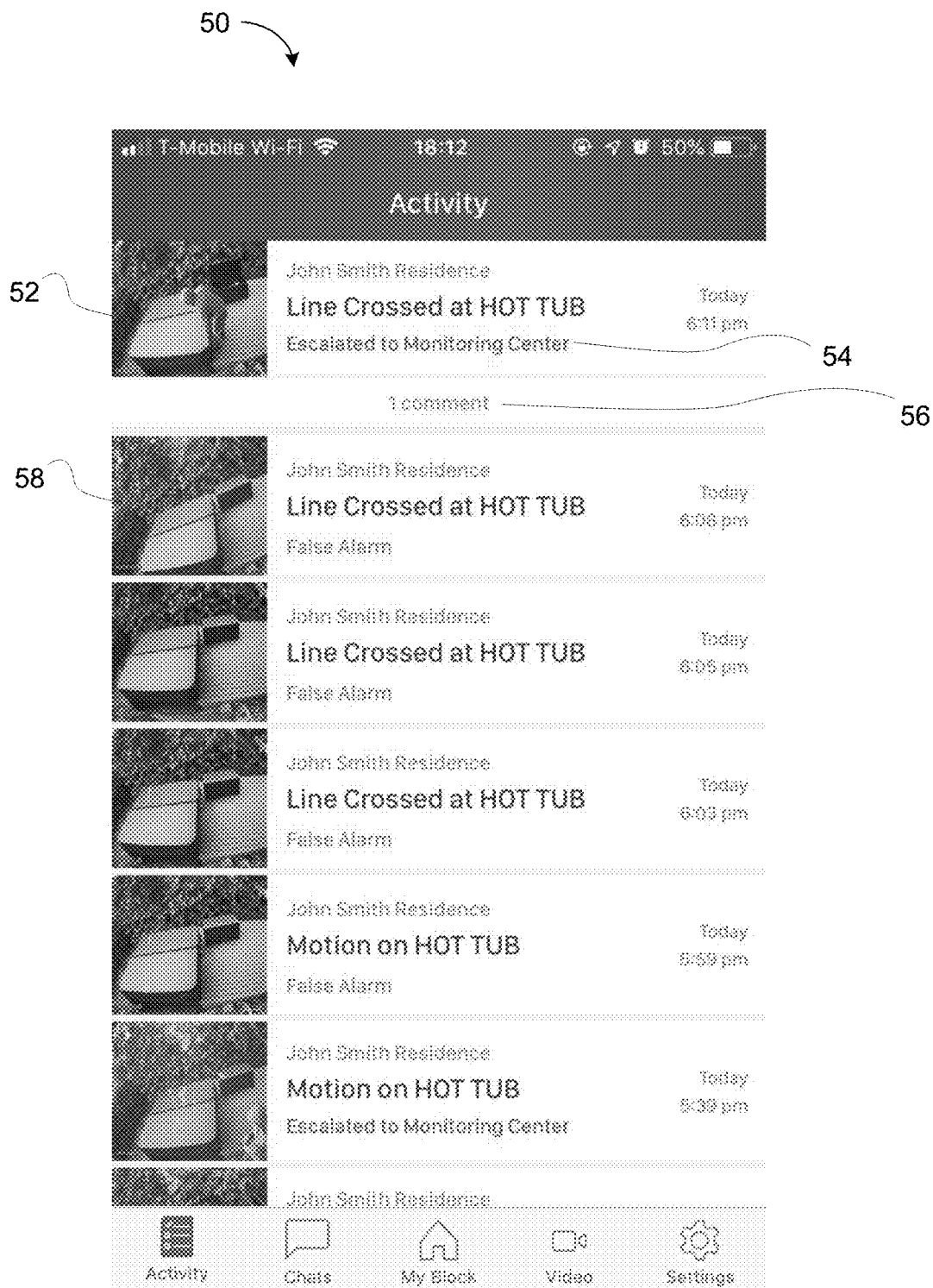
FIG. 5 depicts an additional exemplary user interface of a smartphone app related to team monitoring surveillance systems, in accordance with an embodiment of the invention.

FIG. 5 depicts an additional display of the exemplary user interface of the smartphone app related to team monitoring surveillance systems, in accordance with an embodiment of the invention. In some embodiments, on the activity page rendered by display 50, indications of one or more current or past video event notifications may be shown. At 52, an indication of the current video event notification is shown. Status 54 indicates "Escalated to Monitoring Center" which may have occurred either as an automatic escalation if no responder marked the event as resolved or as a false alarm prior to the pre-configured threshold time value being reached, or as a manual escalation when a responder tapped "Escalate Now" when viewing the video event. At 56, the notation "1 comment" indicates that in the Team Discussion (or virtual control room) associated with the video event notification 52, a responder has written a message to other responders receiving notifications of the video event. At 58, a past video event notification is shown and is marked as a "False Alarm", indicating that a responder tapped the "False Alarm" button while viewing the notification of the video event.

In some embodiments, mobile monitoring agents ("MMAs") are available as an escalation option. An MMA may be an individual who is enrolled to augment the responders that have been preconfigured to receive notifications relating to a zone or premises, but who is otherwise unknown to those responders. Individuals desiring to serve as MMAs may be anyone in the world who has been vetted, passed an online background check, and/or signed an agreement for providing monitoring services. An MMA uses a mobile device, tablet, or other computing device with the team monitoring software app downloaded to it. In some embodiments, MMAs may have profiles which may be reviewed by owners of premises or others responsible for the security of the premises. A profile of an MMA may include pictures, reviews, descriptions, biographical information, an indication of languages spoken, or other demographic information which may enable a premises owner to make a decision as to whether to accept a particular MMA as a contracted team member.

Upon a video event occurring, if no responder uses the app to view the video event, the video event notification can be escalated to an MMA or to a pool of MMAs. In some embodiments, awards are available to contracted MMAs for responding to a video event the quickest following the triggering of that video event. Other fees are payable to contracted MMAs for proper handling of video events according to protocols configured for a particular zone or premises. Beneficially, the sourcing of contracted MMAs to augment the team members responsible for responding to video events associated with a particular zone or premises provides a role for individuals who have time available to accept the responsibility. Such individuals may include special needs adults, those whose circadian rhythm makes them naturally awake in the middle of the night, individuals who want to work from home or have a second job, or who are located in compatible time zones (e.g. if nighttime monitoring of a location in California is desired, an MMA in Asia could provide such monitoring during that individual's daytime period). The MMA provisions disclosed herein can reduce or eliminate a need for central monitoring of a zone or premises, and "gamifies" the monitoring of after-hours surveillance systems.

While various aspects and embodiments have been disclosed herein, other aspects and embodiments will be apparent to those skilled in the art. The various aspects and embodiments disclosed herein are for purposes of illustration and are not intended to be limiting. It is intended that the scope of this disclosure be defined by the following claims and their equivalents.

What is claimed is:

1. A smartphone app user interface, comprising:
a section configured for rendering event notifications needing attention; and
a section configured for rendering event notifications having been viewed,
wherein an event notification includes at least:
an indication of a premise where a video event was triggered;
a description of a type of the video event that was triggered;
a time at which the video event was triggered; and
a thumbnail image associated with the video event that was triggered;
a bar indicating a display of the smartphone app user interface which is currently selected and configured for enabling a user to switch displays;
a control enabling a user to toggle between a live stream and a video recording of a video event that was triggered,
wherein the control enabling the user to toggle between a live stream and a video recording activates RTSP for a camera associated with the premise when the live stream is selected by the user,
wherein the control enabling the user to toggle between a live stream and a video recording renders a video clip of an occurrence which triggered the video event, wherein the video clip of the occurrence which triggered the video event is renderable with an embedded button which, when tapped, switches to the live stream,
wherein at least one of a speaker or a microphone of a smartphone on which the smartphone app user interface is running may be activated during the live stream, wherein activating the at least one of a speaker or a microphone of the smartphone enables a user to speak to a target triggering the video event via at least one of a speaker or a microphone of a monitoring device originating the video event, wherein a video event begins a countdown of an amount of time before a video event is escalated to a monitoring center, wherein a notification associated with the video event is transmitted to the monitoring center when the countdown of the amount of time reaches zero; and an input screen for a user of the smartphone app user interface to participate in a conferencing session related to a video event with one or more members of a team of monitors, wherein the conferencing session may be at least one of a chat room, an audio conference, or a video conference with the one or more members of the team of monitors, and a button which, when activated, causes a video event to be escalated immediately to a monitoring center, wherein at least one of (a) the monitoring center or (b) the one or more members of the team of monitors may be one or more mobile monitoring agents.

\* \* \* \* \*